Jan. 7, 1936.  J. C. HAUN  2,026,891
SELECTIVE CHANNEL CLEANING AND LUBRICATING SYSTEM FOR LUBRICATED VALVES
Filed Aug. 31, 1932   3 Sheets-Sheet 3
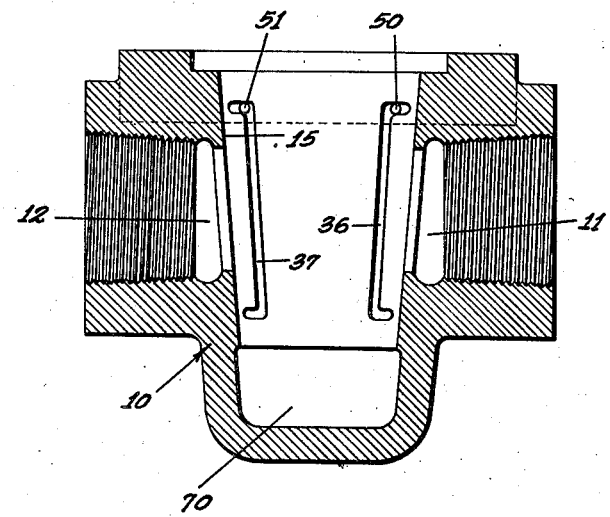
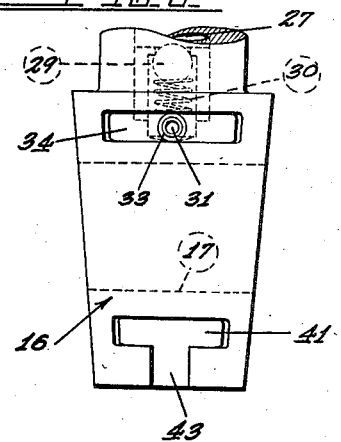
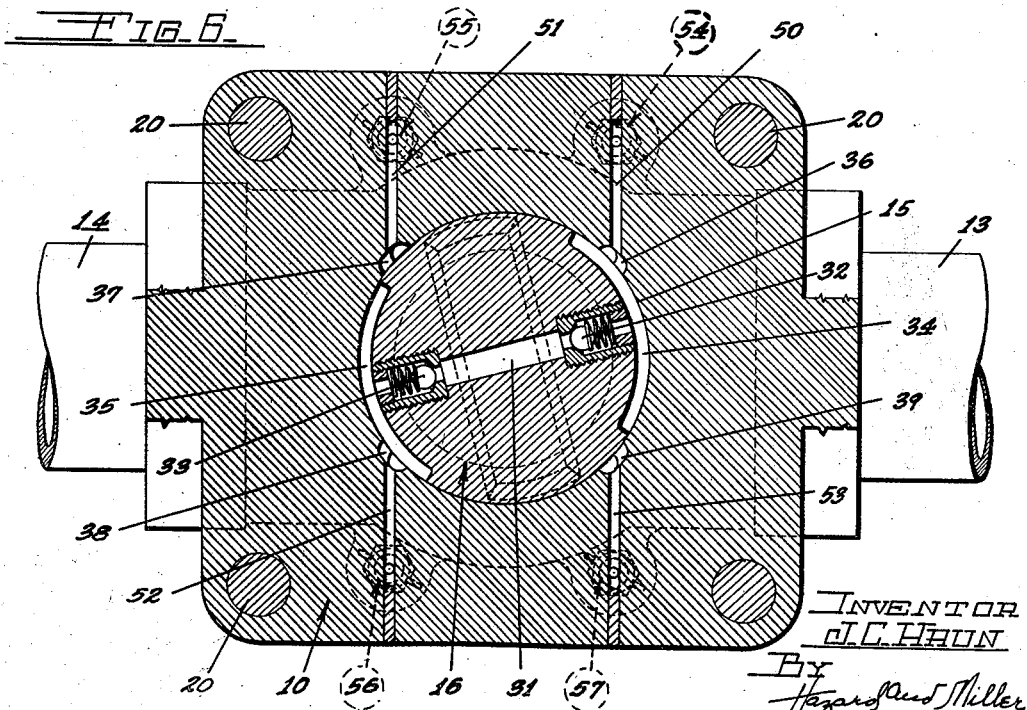
INVENTOR
J. C. HAUN
BY
Hazard and Miller
ATTORNEYS Patented Jan. 7, 1936

2,026,891

UNITED STATES PATENT OFFICE 2,026,891

SELECTIVE CHANNEL CLEANING AND LUBRICATING SYSTEM FOR LUBRICATED VALVES

Joye C. Haun, Manhattan Beach, Calif.

Application August 31, 1932, Serial No. 631,237

4 Claims. (Cl. 251—93)

This invention relates to improvements in lubricated valves and concerns primarily a lubricated valve construction wherein there is a valve housing and a valve closure with lubricant channels between the valve housing and valve closure and an arrangement whereby channels of the lubricant system may be selectively isolated from the remainder of the system and tested or cleaned. In lubricated valves of this general character if one or more lubricant channels should become clogged with clogging material introduced from the line or the lubricant should harden or cake and thus clog the channel, no provision has been made for selectively cleaning and lubricating the clogged channels. The lubricant is ordinarily forced into the system from a single point of application and will follow the course of least resistance through unclogged channels without disturbing the clogged material or caked lubricant in the clogged channels. It is highly desirable to be able to isolate channels from each other and to force a fluid through the isolated channels to remove the clogging or caked material therefrom and to refill these channels with lubricant. It is also highly desirable to be able to selectively test individual channels to determine that they are in proper functioning condition.

An object of the invention is to provide a valve which will accomplish the above mentioned desiderata in that it is possible to selectively isolate channels one from the other and build up a pressure in the individual channels to expel the clogging or caked material and replace with fresh lubricant. The construction lends itself advantageously to employ the method disclosed in my copending application entitled Means and method of cleaning and lubricating valves, Serial No. 631,235, filed August 31, 1932, wherein provision is made for maintaining a body of relatively heavy lubricant available to the system at all times with provision made for introducing a relatively light lubricant into the channels for normal operation at a point spaced from the point of ingress for heavy lubricant.

Another object of the invention is to provide a valve utilizing a spring for urging the tapered rotary plug into seating position and having a well in which a fluid may be confined to exert a pressure in opposition to the spring and to provide a system wherein liquid in the well may be supplied from the lubricant system and retained therein under necessary pressure to oppose the spring even though pressure in the lubricant system may subsequently decrease.

A further object of the invention is to provide a lubricated valve having the above mentioned characteristics in which provision is made for expelling clogging material or caked lubricant from the well into the passage through the plug so that this expelled material may be discharged into the line flow and thus disposed of in instances where the introduction of lubricant into the line flow is not a serious detriment. Where the introduction of lubricant into the line flow is detrimental, provision must be made for expelling the lubricant from the valve through the housing.

With the foregoing and other objects in view, which will be made manifest in the following detailed description, and specifically pointed out in the appended claims, reference is had to the accompanying drawings for an illustrative embodiment of the invention, wherein:

Fig. 4 is a vertical section illustrating a housing of either of the valves shown in Figures 1 and 2.

Fig. 5 is a partial view in side elevation illustrating the plug of the valve.

Fig. 6 is a view similar to Figure 3 illustrating the plug as having been turned into a position to selectively isolate channels for cleaning, testing, or repairing with fresh lubricant.

Figure 1:
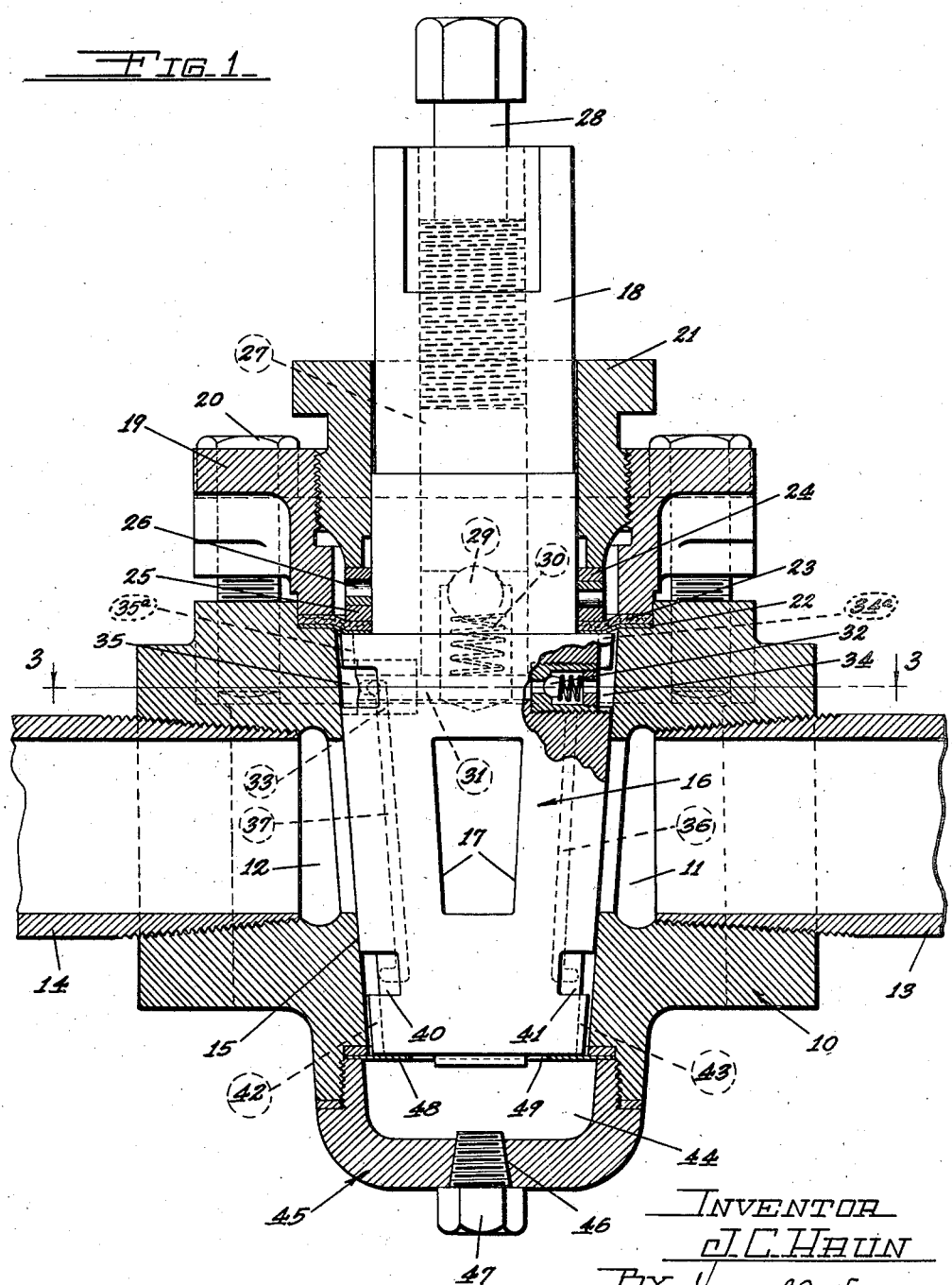
Fig. 1 is a vertical section through a valve embodying the invention illustrating one preferred form of construction.

Referring to the accompanying drawings, wherein similar reference characters designate similar pa s throughout, the improved valve comprises a housing 10 having ports 11 and 12 providing for the attachment of line pipes 13 and 14. The housing provides a tapered bore 15 for a rotary tapered plug 16 having a passage 17 therethrough adapted to be placed in alignment with ports 11 and 12 or positioned at right angles as shown upon the drawings. The plug 16 has a stem or shank 18 and it is retained in position in the housing by means of a cap 19 as by cap screws 20. The cap may have a threaded gland 21 which compresses packing against a shoulder on the plug. This packing may be of any preferred form and may be braided asbestos packing. However, in the preferred form of the invention I use a spring packing employing a thin metal diaphragm or disc 22 engaging with the shoulder over which there is a flexible disc 23 of asbestos or equivalent material. Top and bottom rings 24 and 25 are provided between which there is a corrugated spring ring 26. It will be understood that although the above described packing construction is preferred, its use is optional.

Figure 3:
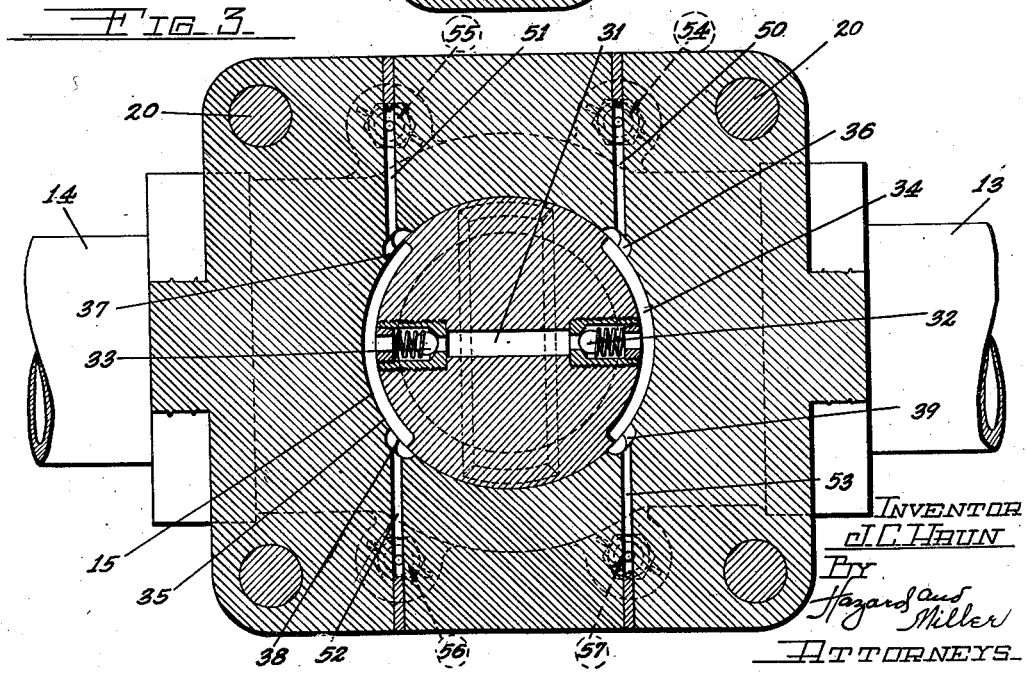
Fig. 3 is a horizontal section which may be considered as having been taken either upon the line 3—3 upon Figure 1 or upon the line 3—3 upon Figure 2 inasmuch as both valves at this line of section have the same appearance.

The plug has its stem provided with a vertical bore 27 through which grease or lubricant may be introduced, the lubricant being forced downwardly through the bore by means of a threaded plug 28. An upwardly closing check valve 29 prevents reverse flow therethrough, the check valve being urged into seating position by means of a spring 30. Bore 27 communicates with a diametrical bore 31 in the plug which preferably has check valves 32 and 33 at its ends. This diametrical bore communicates with two opposite channels 34 and 35 extending around the top of the plug through an arc of approximately ninety degrees. When the plug is in fully closed position, as shown upon Fig. 3, the ends of these channels communicate with upright channels 36, 37, 38 and 39, formed in the seating surface of the housing. At the bottom of the plug there are two opposite horizontal channels 40 and 41 which are beneath their respective upper channels 34 and 35 and these communicate with the lower ends of the upright channels 36, 37, 38 and 39, when the valve is in fully closed position. Downward extensions 42 and 43 are formed on the plug extending downwardly from the horizontal grooves 40 and 41. Corresponding upward extensions 34a and 35a may lead upwardly from channels 34 and 35 respectively to the diaphragm on disc 22 to deliver lubricant to the engaging surfaces between the plug and disc 22 and thus lubricate and form a lubricant seal preventing escape of line pressure or fluid at this point. The housing provides a well 44 at the bottom of the plug, this being provided by a threadedly attached dome shaped cap or member 45 having an opening 46 therein normally closed by a plug 47. An apertured diaphragm 48 is fastened in the well, it having its edges clamped between the cap or member 45 and the body of the housing. This diaphragm is formed of thin sheet metal so as to be flexible and has an aperture 49 formed therein. It extends inwardly beneath the plug and bears against the bottom surface of the plug. In the housing there are formed horizontal plugged bores 50, 51, 52 and 53. Each plugged bore communicates with the upper end of its respective upright channel on the housing. In other words plugged bore 50 communicates with channel 36, plugged bore 51 communicates with channel 37, plugged bore 52 communicates with channel 38 and plugged bore 53 communicates with channel 39. These plugged bores are provided with inlets by means of fittings indicated at 54, 55, 56 and 57. The fittings are preferably provided with ball check valves, as shown, and may have lugs as shown to facilitate the application of a grease gun or the like.

The operation and advantages of the modification disclosed in Figure 1 are as follows. When the valve is in fully closed position as shown, a lubricant may be introduced into the valve through the bore 27 in stem 18. It passes down into the diametrical bore 31, into the upper channels 34 and 35 and from these into the upright channels 36, 37, 38 and 39. From the lower ends of these channels it passes into channels 40 and 41 and from these through the downward extensions 42 and 43, escaping between the diaphragm 48 and the bottom of the plug 16 into the well 44. This lubricant lubricates the valve and the arrangement shown is such as to form a complete circuit of lubricant around each port 11 and 12, thus forming a sealed port valve. When the spring packing is used, such as is disclosed at 26, the gland 21 is tightened down so as to cause the spring packing to urge the plug downwardly or toward its seat with a considerable force largely in excess of the upward force which may be exerted on the plug by the line pressure. If this spring force were left uncounterbalanced it would cause the plug to seize or bind on the housing, even though the plug is lubricated, after a few turns of the plug. However, by having the grease groove system in communication with the well, pressure of the grease groove system is transmitted to the well which exerts an upward force on the plug in opposition to the spring packing so as to largely counterbalance the effort of the spring packing. In this way by properly feeding the lubricant into the lubricant system and into the well a very fine adjustment of the valve is possible which is not possible by tightening down or loosening up gland 21. Furthermore the plug being supported upon the lubricant in the well can be easily turned, there being a minimum amount of friction present. The diaphragm 48 acts somewhat like a check valve in that lubricant from the lubricant system may enter the well and will be retained therein so that if the pressure in the lubricant channels should subsequently decrease, this pressure on the bottom of the plug is retained. In some instances it is desirable to have a body of relatively heavy lubricant available for instant use although a light lubricant is desirable for normal operation to keep the valve in proper working condition. The construction lends itself admirably for this purpose in that a body of heavy lubricant may be preserved in bore 27 below plug 28. Light lubricant can be introduced into the channels through fittings 54, 55, 56 and 57. It will be noted that the points of introduction for light lubricant into the system are remote from the point of introduction for heavy lubricant so that there is no opportunity for the light lubricant on being subjected to pressure escaping between the threads on plug 28 and on the interior of stem 18. The intervening body of heavy lubricant between the bottom of the plug and the plugged bores operates as a seal preventing leakage of light lubricant.

Although the valve above described may be used in this manner to introduce optionally a light or heavy lubricant, the primary purpose of its design is to enable grooves of the lubrication system to be selectively isolated from one another and cleaned out or tested, or individually supplied with fresh lubricant. To accomplish this isolation of grooves the plug 16 is turned from the position shown in Figure 3 into the position shown in Figure 6. In this position it will be noted that groove 39 and groove 37 are cut off or isolated from the remaining part of the system. A fluid can then be injected into grooves 36 and 38 through their respective fittings 54 and 56. When this is done the well is opened by removal of plug 47 and the fluid introduced through these two fittings is forced to pass downwardly through grooves 36 and 38 into grooves 41 and 40, into the well 44, and through the outlet 46. If groove 46 should happen to be plugged or clogged, this will be indicated by a failure of lubricant from being extruded through the outlet 46 when fluid pressure is applied to fitting 54. A high pressure can then be exerted to blow out or flush out this groove. In a similar manner groove 38 can be tested and cleaned out and new lubricant forced into this groove. On applying fluid pressure to either of grooves 36 or 38, the fluid cannot pass into bore 31 because of the check valves, the only outlet being through the bottom horizontal grooves on the plug and through the well. Grooves 36 and 38 can be tested individually with the plug in the position shown in Figure 6. In order to test and clean out grooves 37 and 39, the plug is rotated approximately thirty degrees in a clockwise direction from the position shown in Figure 6 so as to isolate grooves 36 and 38 and leave only grooves 37 and 39 in communication with horizontal grooves 35, 34, 40 and 41. These grooves can be tested with their respective fittings 55 and 57, the clogging material forced out through the outlet and new lubricant applied thereto. When the grooves have thus been tested, cleaned out, and supplied with new lubricant as occasion may require, plug 47 may be replaced and sufficient pressure built up in the system to cause the fluid in well 44 to properly counter-balance the effect of spring 26. It is not necessary in this type of construction to use a plug, as shown at 47. In place of this plug a relief valve of any preferred type, which may be manually operated or which may be automatic, can be substituted to control the openable outlet.

Figure 2:
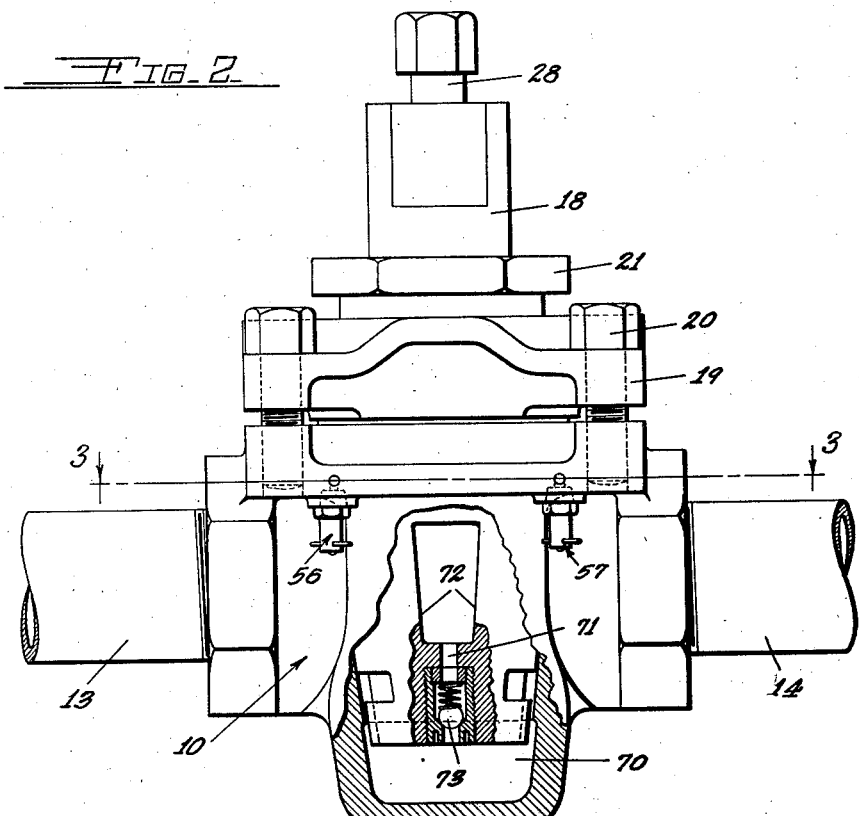
Fig. 2 is a view in side elevation illustrating a modified form of construction.

Figure 2 discloses a modified form of construction which is substantially the same as that disclosed in Figure 1 with the following differences. The well indicated at 70 does not have an openable outlet leading through the housing to the atmosphere nor does it have the diaphragm engaging the bottom of the plug. Communication, however, is established between the lubrication groove system and the well. In this construction the outlet from the well is provided by a vertical bore 71 formed in the plug itself, leading up to the passage 72 formed in the plug. This bore is provided with a check valve 73 permitting flow up into passage 72 but preventing reverse flow. When the valve is in open position, in the case where it is installed in a liquid transmitting pipe line, the various grooves of the lubrication system can be selectively isolated from each other, cleaned out, tested and replaced with fresh lubricant as before described, the old lubricant or clogging material being forced first into the well and then up into the passage 72 to be taken away by the line flow. This type of valve can be used where introduction of lubricant into line flow is not a serious detriment. Where the valve is in a pipe line transmitting a gas, the grooves can be selectively isolated from each other while the plug is in approximately closed position as well as approximately open position and in this respect the clogging material or old grease can be expelled up into passage 72. When the valve is in approximately open position, the old grease will be expelled directly into the line flow. When it is in approximately closed position it will be expelled into passage 72 merely compressing the gas in the passage until the valve is subsequently turned to open position, after which the lubricant or clogging material as the case may be is swept away by the line flow. Reverse flow is prevented by the check valve 73. In this construction also it will be appreciated that it is possible to introduce into the lubricant system a light lubricant while maintaining a body of heavy lubricant in the stem, preventing leakage of light lubricant around the plug at the top of the stem. In this construction the maximum pressure which can be developed in the well 70 in opposition to the spring packing is somewhat dependent on the magnitude of the pressure in the line and in some instances it may be found desirable in this type of valve to use braided asbestos packing as distinguished from the spring packing disclosed on Figure 1.

From the above described constructions it will be appreciated that a novel advantageous valve is provided wherein grooves of the lubricant system may be selectively isolated, tested and supplied with fresh lubricant. Also provision is made for using a spring packing as distinguished from a relatively non-elastic packing, such as braided asbestos, and for delicately counterbalancing the effect of the spring packing in accordance with line conditions so that the plug will be urged into seating position with sufficient force to preserve a tight valve yet it will not be seated with so great a force as to cause the plug to bind or seize. The fluid pressure used in counterbalancing the spring packing can be entrapped in the well to exert this counterbalancing effort regardless of lower pressures which may occur in the lubricant system. In other words the liquid in the well can be entrapped and maintained therein under a desired pressure even though lubricant in the lubricant system may escape and the pressure in the lubricant system decrease.

In some instances where the incoming or upstream pressure is quite high as compared with the downstream or outlet pressure, the plug is forced by this upstream pressure to one side of the seat. The present construction enables the introduction of a lubricant of a different viscosity into the lubricant channels on the downstream side of the plug should this be found desirable.

Various changes may be made in the details of construction without departing from the spirit or scope of the invention as defined by the appended claims.

I claim:

1. In a lubricated valve having a housing and a rotary plug, lubricant channels on the plug, means for supplying lubricant to the channels through the plug, there being a well on the housing in communication with the channels, means providing an openable outlet in the well, means for forcing a fluid through selected channels into the well and through the outlet, and check valves preventing flow from the selected channels into other of the channels.

2. In a lubricated valve having a housing and a rotary plug, lubricant channels on the housing, means for supplying lubricant to the channels through the plug, there being a well on the housing in communication with the channels, means providing an openable outlet in the well, means for forcing a fluid through selected channels into the well and through the outlet, without forcing it through other of the channels, and check valves preventing flow from the selected channels into other of the channels.

3. In a lubricated valve having a housing and a rotary plug, lubricant channels between the plug and housing, means for applying lubricant to the channels through the plug, there being a well on the housing in communication with the channels, means providing an openable outlet in the well, means for forcing a fluid through selected channels into the well and through the outlet, and check valve means preventing flow from the selected channels into other of the channels.

4. In a lubricated valve having a housing and a rotary plug, lubricant channels on the plug and housing, means for supplying lubricant to the channels through the plug, there being a well on the housing in communication with the channels, said plug having a passage therethrough, means providing an openable outlet from the well into the passage, check valve means preventing reverse flow from the passage into the well, means for forcing a fluid through selected channels into the well and through the outlet, and check valves preventing flow from the selected channels in other of the channels.

JOYE C. HAUN.